US005618063A

United States Patent [19]

Chang et al.

[11] Patent Number: 5,618,063

[45] **Date of Patent: *Apr. 8, 1997**

[54] MULTICOLOR HEAT-SENSITIVE VERIFICATION AND HIGHLIGHTING SYSTEM

[75] Inventors: John C. H. Chang, Naperville; Eric B. Wendler, Aurora; Vance P. Gregory, Jr., Wheaton, all of Ill.

[73] Assignee: Wallace Computer Services, Inc., Hillside, Ill.

[ * ] Notice: The term of this patent shall not extend beyond the expiration date of Pat. No. 5,344,191.

[21] Appl. No.: 416,283

[22] Filed: Apr. 4, 1995

Related U.S. Application Data

[63] Continuation-in-part of Ser. No. 987,710, Dec. 9, 1992, Pat. No. 5,427,415.

[51] Int. Cl.[6] .......................... B42D 15/10; B41M 5/28; B23B 3/16

[52] U.S. Cl. ............................ 283/67; 283/91; 283/94; 283/95; 283/57; 283/58; 283/902; 283/904; 283/114

[58] Field of Search ............................ 283/57, 58, 67, 283/87, 91–95, 114, 902, 904, 900, 901; 359/43, 288; 106/22 R, 23 R, 23 C; 427/258, 259, 288, 145; 428/195, 199, 206, 207, 321.5, 913, 914; 503/209, 204, 206, 226, 200; 430/138

[56] References Cited

U.S. PATENT DOCUMENTS

| | | | |
|---|---|---|---|
| 2,235,791 | 3/1941 | Wohlers . | |
| 2,374,862 | 5/1945 | Green . | |
| 2,929,736 | 3/1960 | Miller et al. | 117/36 |
| 3,713,861 | 1/1973 | Sharp | 117/15 |
| 3,829,133 | 8/1974 | Smagala-Romanoff | 283/6 |
| 3,914,511 | 10/1975 | Vassiliades . | |
| 3,916,068 | 10/1975 | Kohmura et al. | 428/411 |
| 3,924,049 | 12/1975 | Truitt et al. . | |
| 3,984,605 | 10/1976 | Kohmura et al. | 428/411 |
| 4,037,007 | 7/1977 | Wood | 428/199 |
| 4,109,047 | 8/1978 | Fredrickson | 428/307 |

(List continued on next page.)

FOREIGN PATENT DOCUMENTS

| | | |
|---|---|---|
| 2122693 | 11/1994 | Canada . |
| 2722427 | 5/1977 | Germany . |
| 2913321 | 4/1979 | Germany . |
| 61-248784 | 11/1986 | Japan . |
| 62-227794 | 10/1987 | Japan . |
| 2122995 | 5/1990 | Japan . |
| 1520919 | 12/1975 | United Kingdom . |
| 2188283 | 9/1987 | United Kingdom . |
| 9100390 | 1/1991 | WIPO . |

OTHER PUBLICATIONS

Research Disclosure, (No. 18747), Nov. 1979, pp. 638–639.
"Expanding Here and Abroad", Keen, Form Magazine, Apr. 1995, pp. 88–94.

*Primary Examiner*—Frances Han
*Attorney, Agent, or Firm*—Roylance, Abrams, Berdo & Goodman, L.L.P.

[57] ABSTRACT

A document capable of providing multiple colors under the application of heat comprising a support having at least one surface bearing a first coating comprising a substantially colorless, heat activatable chromogenic composition capable of producing a first color under the application of heat, and a second coating comprising a localized coating of a substantially colorless, heat activatable chromogenic composition capable of producing a second color under the application of heat. Each chromogenic composition comprises a chromogenic compound and a color developer that are substantially colorless solids in physical contact prior to reaction, but which can chemically react to produce a visible colored image by application of heat at temperatures above room temperature. Under the application of heat from a thermal printer, by quickly striking the chromogenic composition with a fingernail or blunt object to produce frictional heat, or other heat application, multicolored images are provided.

28 Claims, 4 Drawing Sheets

U.S. PATENT DOCUMENTS

| | | | |
|---|---|---|---|
| 4,175,774 | 11/1979 | Tonges et al. | 283/6 |
| 4,183,989 | 1/1980 | Tooth | 428/195 |
| 4,186,020 | 1/1980 | Wachtel | 106/22 |
| 4,197,346 | 4/1980 | Stevens | 428/307 |
| 4,210,346 | 7/1980 | Mowry, Jr. et al. | 283/8 B |
| 4,226,912 | 10/1980 | Iwasaki et al. | 428/411 |
| 4,303,307 | 12/1981 | Tureck et al. | 350/276 R |
| 4,334,771 | 6/1982 | Ryan, Jr. . | |
| 4,360,548 | 11/1982 | Skees et al. | 428/29 |
| 4,376,887 | 3/1983 | Greenaway et al. | 235/487 |
| 4,425,386 | 1/1984 | Chang | 427/256 |
| 4,427,985 | 1/1984 | Kikuchi et al. . | |
| 4,457,540 | 7/1984 | Hohne . | |
| 4,488,646 | 12/1984 | McCorkle | 206/459 |
| 4,505,498 | 3/1985 | Weinberger | 283/91 |
| 4,638,340 | 1/1987 | Iiyama et al. . | |
| 4,663,641 | 5/1987 | Iiyama et al. . | |
| 4,665,410 | 5/1987 | Iiyama et al. | 346/204 |
| 4,726,608 | 2/1988 | Walton | 283/96 |
| 4,760,048 | 7/1988 | Kurihara et al. | 503/204 |
| 4,816,367 | 3/1989 | Sakojiri et al. | 430/138 |
| 4,833,122 | 5/1989 | Doll et al. . | |
| 4,846,502 | 7/1989 | Chang et al. | 283/57 |
| 4,851,383 | 7/1989 | Fickenscher et al. . | |
| 4,861,749 | 8/1989 | Satake et al. | 503/211 |
| 4,865,939 | 9/1989 | Usami et al. | 430/138 |
| 4,873,219 | 10/1989 | Brown et al. | 503/204 |
| 4,894,359 | 1/1990 | Ueno et al. | 503/209 |
| 4,898,849 | 2/1990 | Kang . | |
| 4,903,991 | 3/1990 | Wright . | |
| 4,906,604 | 3/1990 | Okamoto et al. | 503/204 |
| 4,935,401 | 6/1990 | Pendergrass, Jr. . | |
| 4,985,331 | 1/1991 | Saeki et al. | 430/138 |
| 4,990,482 | 2/1991 | Nigorikawa et al. | 503/209 |
| 4,999,334 | 3/1991 | Mehta et al. | 503/226 |
| 5,001,104 | 3/1991 | Morita et al. . | |
| 5,039,652 | 8/1991 | Doll et al. . | |
| 5,047,308 | 9/1991 | Usami | 430/138 |
| 5,083,816 | 1/1992 | Folga et al. . | |
| 5,120,702 | 6/1992 | Minami et al. . | |
| 5,193,854 | 3/1993 | Borowski, Jr. et al. | 283/87 |
| 5,209,515 | 5/1993 | Dotson et al. . | |
| 5,260,252 | 11/1993 | Frangie et al. | 503/206 |
| 5,288,107 | 2/1994 | Johnson et al. . | |
| 5,344,191 | 9/1994 | Chang et al. | 283/72 |
| 5,346,878 | 9/1994 | Nakasuka et al. | 503/209 |
| 5,401,060 | 3/1995 | Chang et al. | 283/57 X |
| 5,409,797 | 4/1995 | Hosoi et al. | 430/138 |
| 5,409,880 | 4/1995 | Itabashi et al. | 503/204 |
| 5,427,415 | 6/1995 | Chang et al. | 283/57 X |
| 5,462,909 | 10/1995 | Lakes et al. | 503/201 |
| 5,486,446 | 1/1996 | Matushita et al. | 430/156 |
| 5,524,934 | 6/1996 | Schwan et al. | 283/95 |

FIG. 1
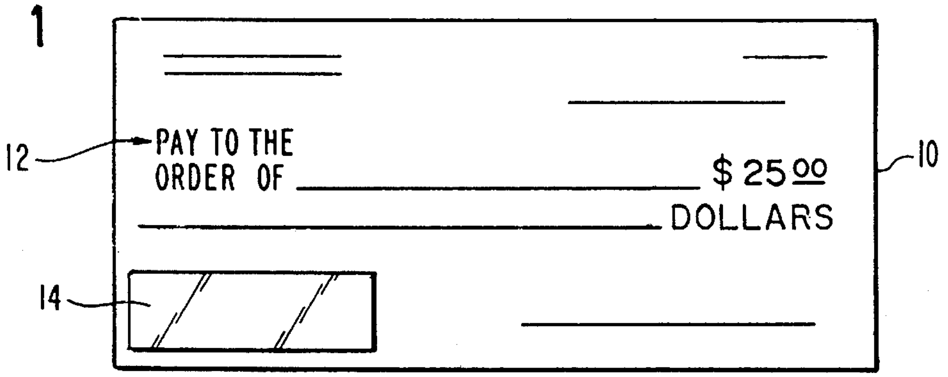
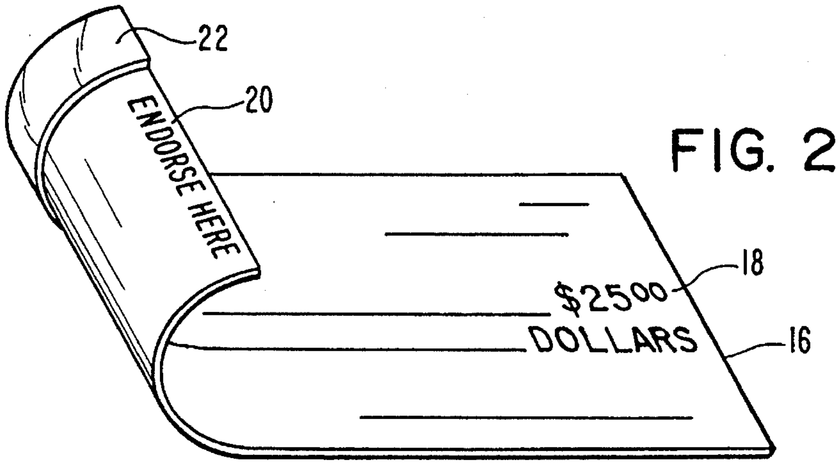
FIG. 2
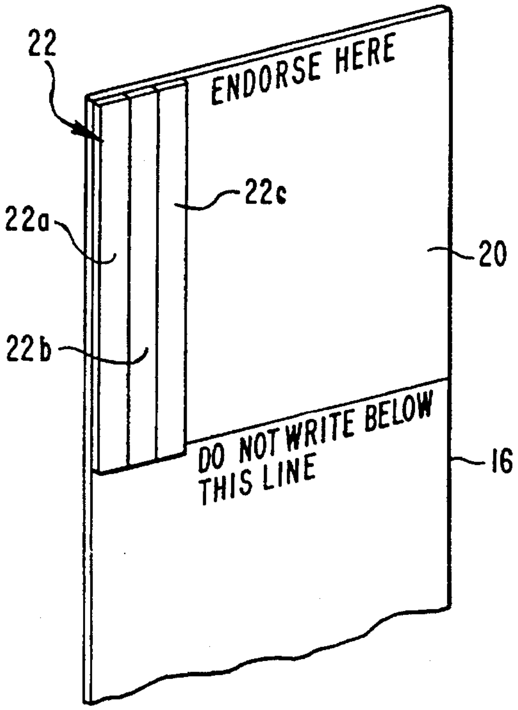
FIG. 3
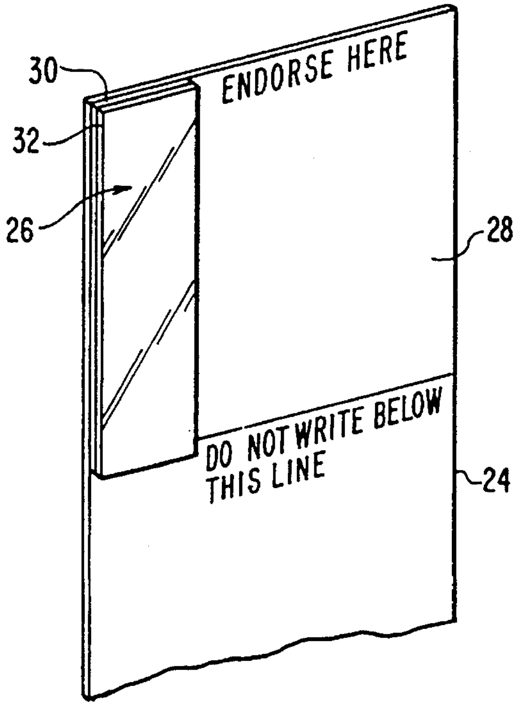
FIG. 4

FIG. 8
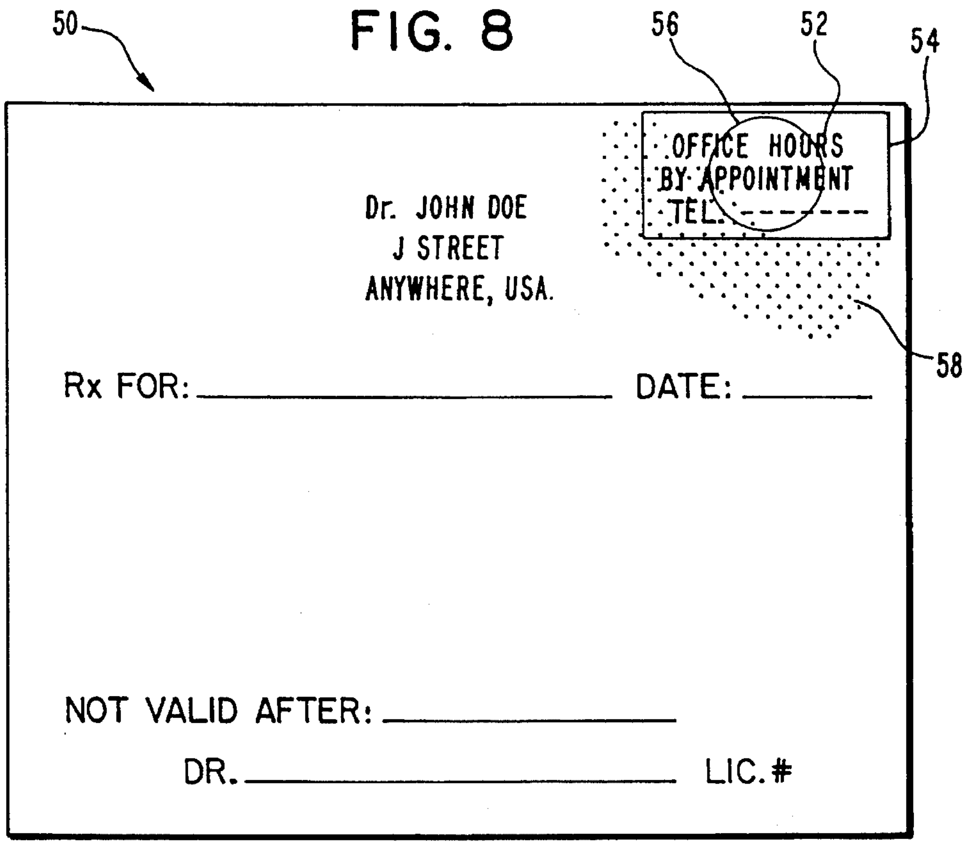
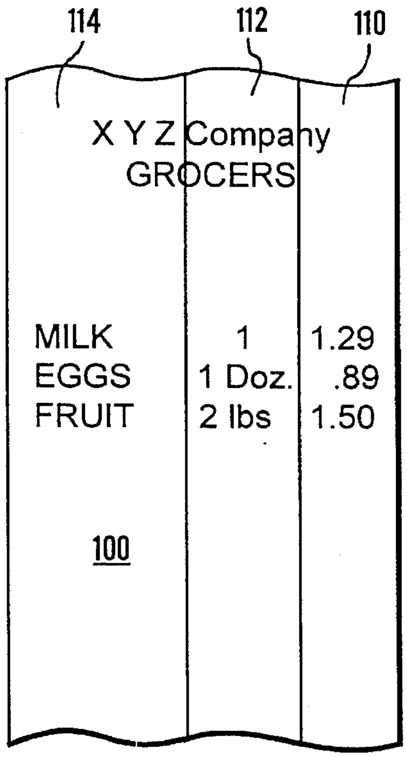
FIG. 9
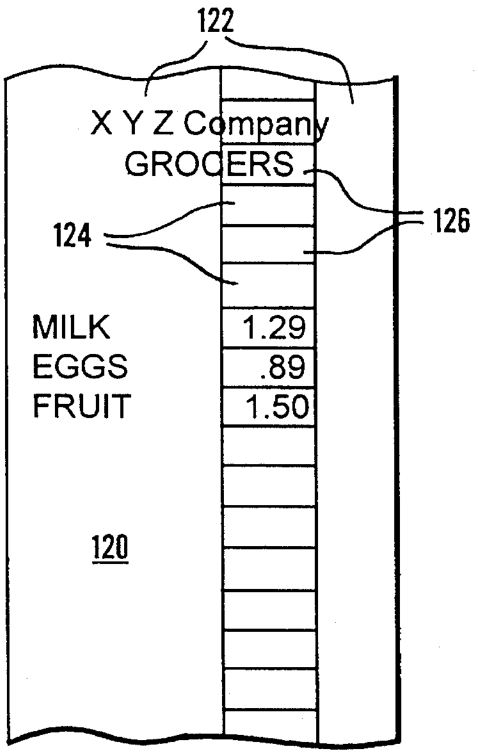
FIG. 10

MULTICOLOR HEAT-SENSITIVE VERIFICATION AND HIGHLIGHTING SYSTEM

CROSS-REFERENCE TO RELATED APPLICATION

This is a continuation-in-part of U.S. application Ser. No. 07/987,710 filed Dec. 9, 1992 in the name of John C. H. Chang entitled "Heat Sensitive System and Use Thereof", now U.S. Pat. No. 5,427,415, the disclosure of which is hereby incorporated by reference.

Reference is hereby made to U.S. application Ser. No. 07/987,694 filed Dec. 9, 1992 entitled "Hidden Entry System and Use Thereof" to John C. H. Chang and Peter A. Walter, now U.S. Pat. No. 5,344,191, the disclosure of which is hereby incorporated by reference.

FIELD OF THE INVENTION

The present invention is directed to a multicolor heat sensitive chromogenic system which is heat activatable at relatively low temperatures. More particularly, this invention relates to documents having a localized, non-pressure sensitive chromogenic coating that can be activated by heat to produce visible multicolored markings for determining authenticity and for highlighting information.

BACKGROUND OF THE INVENTION

Various methods of providing documents, such as negotiable instruments, with tamper evident systems to prevent alteration have been proposed. Likewise, systems have also been developed to prevent reproduction of documents by photocopying to reduce the incidence of fraud. However, in recent years advanced color copiers which are readily accessible to the general public can produce nearly exact duplicates of the original document. It is very difficult for the untrained person to distinguish the original from an illicit reproduction. To prevent passing off of the reproduction as the original, efforts have been made to make the original document incapable of being copied or to incorporate authenticating systems into the document.

One known method of producing a paper that is useful for preventing fraud in security documents is to print the paper with a chemical in the form of an invisible image. When a bleach solution or an ink eradicator is applied over the area of the invisible image, a colored image appears to confirm its authenticity. However, this method is often undesirable because the bleach solution is corrosive, the ink eradicator contains toxic solvents, and the solution tends to warp or otherwise permanently damage the document.

Another method is to print a document with a fluorescent ink which is colorless under visible light, but becomes discernible when exposed to ultra-violet light. Similarly, a fluorescent ink may be printed on a document for automatic identification by an electronic scanner such as that disclosed in U.S. Pat. No. 4,186,020 to Wachtel. The use of fluorescent ink requires access to a source of ultraviolet light or a document verifying electronic scanner. This prevents quick and easy verification of the document.

A further prior method is disclosed in U.S. Pat. No. 4,183,989 to Tooth in which security paper is provided with a strip, thread or planchette having at least two machine verifiable security features, one of which is a magnetic material and a second of which is a luminescent material, an X-ray absorbent or a metal. Since most security documents are printed paper products with different base weight, color and texture requirements, the availability of various papers having these security features is very limited. This system also has the disadvantage of requiring specialized and expensive verifying machines to examine the documents and determine its authenticity.

U.S. Pat. No. 4,726,608 to Walton discloses the use of an opaque coating over an authenticating indicia. The image of the indicia is later made visible by scratching off the opaque coating or by applying a solvent to disperse the coating. This system further has the disadvantage of either requiring solvents or producing unwanted dust.

Still another method identifying forgeries is by micro-printing where a message, logo, or name is printed in very small type as a border around the face of the document. Generally, the message cannot be read by the naked eye, and requires some magnification to make it legible. Copiers cannot duplicate the micro-printing with sufficiently high resolution, so that on a copy the words become just a broken line or blur. However, the tellers at a bank or persons accepting the document generally do not have access to magnifiers and thus, a copy will not be easily noticeable.

"Sunburst" or "Rainbow" printing is sometimes used to help defeat color copiers in which the document is printed with one intense color at one side of the document which slowly fades into another color across the width of the paper. Eventually the second color intensifies at the opposite side. This is a visual system that is difficult to duplicate on a copier. If the original printing is not available for comparison, it is extremely difficult for the untrained eye to know it is a copy or authentic.

Another method is disclosed in U.S. Pat. No. 4,210,346 to Mowry Jr. et al. in which "VOID" or other warning messages is pre-printed in halftone or multitone on the document to camouflage the pre-printing. These pre-printed messages are blended into the surroundings of the document so that human eyes see them as a uniform printing. The pre-printed "VOID" or warning messages will appear on the illegal copy by many color copiers. However, more sophisticated color copiers have been developed in recent years so that a skillful lawbreaker can now reproduce a security document without the pre-printed warning messages appearing on the copies.

Another method of reducing the risk of fraud is to incorporate a color forming substance into the substrate of the document. To verify the authenticity of a document, a second color forming substance which is capable of taking part in a color-forming reaction is applied to the security document to reveal the hidden images or produce color changes. Examples of this form of detection system are disclosed in U.S. Pat. Nos. 4,037,007 to Wood and 4,360,548 to Skees et al. However, the second color forming substance is not generally available at every location where the security documents are handled or whenever it is needed. Thus, these documents can not be readily tested for their authenticity.

The above noted security and authentication systems have not entirely prevented unauthorized or fraudulent reproduction of documents. Accordingly, a need still exists for a simple and efficient system which is able to accurately authenticate a document and distinguish it from a reproduction.

SUMMARY OF THE INVENTION

A multicolor heat sensitive system has now been discovered which can be used to identify an illicit reproduction of a document, such as a negotiable instrument, a pharmaceutic prescription, redeemable coupon, cash register receipt or the like. Likewise, the present multicolor heat sensitive system can be used to color highlight desired information on such documents, as well as receipt paper used in automatic teller machines (ATM) and pressure sensitive labels.

The system of the present invention involves a document capable of providing multiple colors under the application of heat, comprising a support having at least one surface bearing a first coating comprising a substantially colorless, heat activatable chromogenic composition capable of producing a first color under the application of heat, and a second coating comprising a localized coating of a substantially colorless, heat activatable chromogenic composition capable of producing a second color under the application of heat, the first and second coatings being non-coextensive, and each of the first and second coatings be at least partially exposed.

Each chromogenic composition comprises a chromogenic compound and a color developer, in which the chromogenic compound and the color developer are substantially colorless solids in physical contact prior to reaction, but which can chemically react to produce a visible colored image by application of heat at temperatures above room temperature.

Surprisingly, it has been found that by using multiple coatings of a non-pressure sensitive, heat activatable chromogenic composition, not only can illicit reproductions of an authentic document be revealed with application of heat, but desired information, such as price information can be highlighted. Moreover, since the present system is heat sensitive and not pressure sensitive, premature verification by ordinary writing and handling pressures is avoided. Thus, while the heat activatable coating of the present invention may be subjected to ordinary writing pressures without producing the desired visible colored image before verification is required, application of heat by any suitable means, such as a thermal printer, frictional heat, or the like to the coating will result in multiple, visible colored images.

According to one embodiment of the present invention, a document is provided which is capable of providing multiple colors under the application of heat, comprising a substrate having at least one surface bearing multiple, non-coextensive, localized coatings each comprising a substantially colorless, heat activatable chromogenic composition in which each coating is capable of producing a different color under the application of heat and each coating is partially exposed. Such document has application, for example, as cash register receipt paper or ATM receipt paper in which, for example, a localized coating may be provided in the form of one or more longitudinal, continuous, non-coextensive stripes, which when printed by application of the heated stylus of a thermal printer provide attractive highlighting for product information, price information, or the like, for the customer, while providing verification means against unauthorized photoduplication.

According to another embodiment of the present invention, a document capable of providing multiple colors under the application of heat, comprises a substrate having at least one surface bearing multiple, non-coextensive, localized, discontinuous coatings, each coating comprising a substantially colorless, heat activatable chromogenic composition capable of producing a different color under the application of heat. Such document has application, for example, as cash register receipt paper or ATM receipt paper having the localized chromogenic coatings in the form of irregular patterns or regular geometric patterns, which can provide attractive highlighting verification against unauthorized photoduplication.

According to another embodiment of the invention, a printing system for producing printed receipts capable of authentication is provided comprising a thermally heated printing stylus for producing a visible image by application of heat, and a receipt form comprising a support having at least one surface bearing a first coating comprising a substantially colorless, heat activatable chromogenic composition capable of producing a first color under the application of heat, and a second coating comprising a localized coating of a substantially colorless, heat activatable chromogenic composition capable of producing a second color under the application of heat, the first and second coatings being non-coextensive. Each of the first and second coatings are at least partially exposed, each chromogenic composition comprising a chromogenic compound and a color developer, the chromogenic compound and the color developer being substantially colorless solids in physical contact prior to reaction, but which can chemically react to produce a visible colored image by application of heat at temperatures above room temperature. The thermal printing stylus forms a visible, multicolored image upon contact with the first and second coatings.

According to another embodiment of the present invention, a method of verifying the authenticity of the multicolored document is achieved by applying frictional heat to the surface of the document, such as in a verification area comprising one or more of the multiple heat activatable chromogenic coatings, by rubbing or striking a human fingernail across the chromogenic coating compositions, to form visible colored or multicolored images, whereby the chromogenic compositions are activatable by frictional heat but not pressure. The expression "strike" as used in the present application is in the sense that one strikes a match across a rough surface to generate frictional heat. In the present invention, striking or quickly moving the human fingernail or other frictional heat generating stylus across the chromogenic composition generates sufficient frictional heat to cause visible color formation.

According to another embodiment of the present invention, verification of authenticity of the document may be achieved by applying heat to one or more of the multiple chromogenic compositions by means of a radiant or convective heat source, such as the heat emanating from an ordinary light bulb used for reading, for example, a 100 watt light bulb, or from an electric hair dryer, to cause visible color formation in the chromogenic composition. Likewise, heat can be directly applied by conduction using an electrically or otherwise heated element such as the stylus of a thermal printer used in connection with, for example, a cash register receipt or an ATM machine receipt.

In a preferred embodiment of the present invention, the heat activatable chromogenic composition comprises a color forming chromogenic compound and a color developer material. In an especially preferred embodiment of the invention, a heat fusible material is also included in the chromogenic composition to lower the melting point of the color developer material. Preferably, the color developer material is a normally solid, acidic organic compound having a melting temperature between 40° C. and 200° C. so that the developer will melt or soften sufficiently by frictional heat or heat supplied by a relatively low heat generating device, such as an electric light bulb or hair dryer, to react with the chromogenic compound to produce a visible colored image. The original document can be distinguished from a reproduction by applying heat, for example, by quickly rubbing or striking a fingernail, paper clip, coin, pen or other implement across the verification area to produce sufficient frictional heat, or by applying convective, radiant or conductive heat to the verification area to produce the visible colored or multicolored image.

As used in the present application, the term "principal image" is defined as a visible image which is applied or present on the document in the information area in printed or written form.

In the embodiment of the present invention where the document is a negotiable instrument, such as a check, money order, etc., the principal image can be a monetary amount in numerical or written form, name of the financial institution, name of the payor or the payee. Likewise, the principal image can be all or a portion of the written material of the document which is subject to unauthorized reproduction and fraudulent passing off as the original document. Likewise, in the embodiment of the present invention where the document is a medical prescription, the principal image can be both preprinted matter and hand-written information.

Other objects, advantages and salient features of the present invention will become apparent from the following detailed description, which, taken in conjunction with the annexed drawings, discloses preferred embodiments of the invention.

BRIEF DESCRIPTION OF THE DRAWINGS

Referring now to the drawings which form a part of this original disclosure:

FIG. 1 is a front view of a negotiable instrument showing the verification area on the front face of the instrument;

FIG. 2 is a schematic and perspective view of the negotiable instrument in the form of a check showing the endorsement area on the reverse side of the instrument with the verification area contained therein;

FIG. 3 is a schematic and perspective view of the check of FIG. 2 in accordance with a multicolor image-providing embodiment of the invention;

FIG. 4 is a partial, schematic and perspective view of the check of FIG. 2 modified according to one embodiment of the invention;

FIG. 8 is a front view of a prescription blank showing the verification area under printed matter in accordance with a preferred embodiment of the invention;

FIG. 9 is a front partially sectioned view of a cash register receipt having thermally printed highlighted matter;

FIG. 10 is a front partially sectioned view of a cash register receipt having thermally printed highlighted matter in multiple colors;

DETAILED DESCRIPTION OF THE INVENTION

Figure 5:
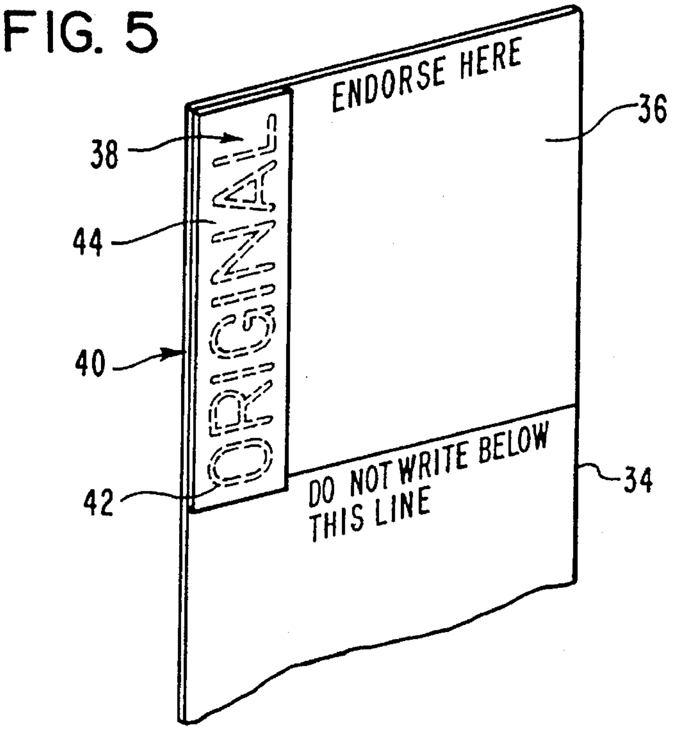
FIG. 5 is a partial, schematic and perspective view of the check of FIG. 2 having a latent image in the verification area.

Referring to the drawings, FIGS. 1 and 2 illustrate a verification system in combination with a document 10, which in this embodiment is a bank check. The document 10 includes an information area 12 bearing a principal image and a verification area 14.

The term "document" as used herein is intended to include any type of document or paper which can be reproduced by a photocopier or other reproduction equipment. The documents of particular interest are those documents which have a high incidence of reproduction for fraudulent purposes. In preferred embodiments of the invention, the document is a negotiable instrument such as a money order or check including personal checks, cashier's checks and traveler's checks. In further embodiments, the document may include, for example, pharmaceutical prescriptions, contracts, letters, deeds, wills, bills of exchange, certificates of deposit, warrants, stocks, bonds, identification cards, lottery tickets, sweepstakes, raffles, prizes and awards. As used herein, the expression "negotiable instrument" refers to any instrument which can be exchanged for or represents a monetary amount or its equivalent value.

The information area 12 on the check of the embodiment of FIG. 1 is filled in with specific information at the time the check is issued in a manner similar to conventional check writing procedures. The information area will include such information as the date, the amount of the check, the name of the bank, the payee, the signature of the payor and the endorsement of the payee. The printed information contained in the information area comprises a principal image of the document.

The verification area 14 in the embodiment of FIG. 1 is positioned in the lower left hand corner of the front face of the check in the area typically identified as "memo" for entering a personal reference by the person drawing the check. It is to be understood that the verification area may be located in any position or area on the check and that multiple verification areas may be present, such as on both the front and rear faces of the document. A localized coating of a heat activated, non-pressure sensitive chromogenic composition is applied to the verification area. Multiple localized heat activatable coatings may be provided on the document at spaced positions to provide multiple verification areas or within a single verification area to provide multiple colors within a single verification area.

The chromogenic compound in preferred embodiments is colorless or substantially colorless before reacting with the color developer to produce the colored image. Suitable types of chromogenic compounds include diarylmethanes, triarylmethanes, indolylphthalides, azaphthalides, fluorans, and spiropyrans. Exemplary diarylmethanes include 4,4'-bis-(dimethylaminobenzhydrylbenzyl)ether, N-halophenyl leuco auramine, and N-2,4,5-trichlorophenyl leuco auramine. Examples of triarylmethanes include 3,3-bis(p-dimethylaminophenyl)-6-dimethylaminophthalide and 3,3-bis(p-dimethylaminophenyl)phthalide. Examples of indolylphthalides include 3-(p-dimethylaminophenyl)-3-(1, 2-dimethylindole-3-yl)phthalide, 3,3-bis(1-octyl-2-methylindol-3-yl)phthalide and 3-(p-dimethylaminophenyl)-3-(2-methylindole-3-yl)phthalide. Examples of azaphthalides include 3-(2-ethoxy-4-diethylaminophenyl)-3-(1-octyl-2-methylindole-3-yl)-4-azaphthalide and 3-(2-ethoxy-4-diethylaminophenyl)-3-(1-ethyl-2-methylindole-3-yl)-4-azaphthalide. Examples of fluorans include 2-dibenzylamino-6-diethylaminofluoran, 2-anilino-6-diethylaminofluoran, 3-methyl-2-anilino-6-diethylaminofluoran, 2-anilino-3-methyl-6-(ethyl-isopentylamino)fluoran, 2-anilino-3-methyl-6-dibutylaminofluoran, 2-chloro-3-methyl-6-diethylaminofluoran, 3,6-dimethoxyfluoran, and 7,7'-bis(3-diethylaminofluoran). Examples of spiropyrans include 3-methylspirodinaphthopyran, 3-ethylspirodinaphthopyran, 3,3'-dichlorospirodinaphthopyran, 3-benzylspirodinaphthopyran, and 3-methylnaphtho-(3-methoxybenzo)spiropyran.

The preferred color developers are acidic compounds which have melting or softening points of about 40° C. to about 200° C. In preferred embodiments of the invention, the lower melting point developers having melting or softening points preferably from about 40° C. or 50° C. to about 110° C. or about 140° C., with from about 50° C. to about 80° C. being especially preferred so that the colored image is easily formed by applying frictional heat or similar low temperatures. The developer melting point should, however, be sufficiently high to avoid melting and thus premature activation and formation of the colored image during drying of the coating, shipping and handling of the document. Examples of useful color developers include: 4,4'-isopropylidenedi-phenol, 4,4'-isopropylidene-bis(2-tert-butylphenol), 4,4'-secbutylidenediphenol, 2,2'-methylene-bis(4-chlorophenol), phenol-formaldehyde novolak resin, alphanaphthol, betanaphthol, p-hydroxybenzyl benzoate, 3,5-dimethyl-4-hydroxybenzoic acid, 3-isopropylsalicylic acid, 3-benzylsalicylic acid, 3,5-di-tert-butylsalicylic acid, 1,5-di(4-hydroxyphenylthio)-3-oxapentane, 4-hydroxyphenyl-4'-isopropoxyphenylsulfone, bis(3-allyl-4-hydroxyphenyl)sulfone, 4,4'thiodiphenol, and 3,3'-dimethyl-4,4'thiodiphenol.

The proportions of chromogenic compound and color developer in the coating varies according to the required color density of the image. Generally, about 1 to 50 parts by weight, and preferably about 1 to 10 parts by weight, of color developer is used per part by weight of chromogenic compound to produce a colored image with sufficiently sharp contrast to readily distinguish the colored image from the principal image. If desired, however, the colored image may be the same as the principal image.

When the color developers have a high melting point, a heat-fusible material may be used in the chromogenic composition to lower the activation point or temperature of the color developer to facilitate the color development. Exemplary heat-fusible materials include stearic acid amide, stearic acid methylene bisamide, oleic acid amide, palmitic acid amide, coconut fatty acid amide, monoethanolamide of fatty acid, dibenzyl terephthalate, p-benzyl biphenyl, betanaphthol benzyl ether, ethylene glycol-m-tolyl ether, di(p-chlorobenzyl) oxalate, dibenzyl oxalate and di(p-methylbenzyl) oxalate.

The chromogenic coating composition may also contain one or more inorganic or organic fillers, such as kaolin, talc, titanium dioxide, calcium carbonate, magnesium carbonate, barium carbonate, aluminum hydroxide, zinc oxide, silicone oxide, urea-formaldehyde resin, styrene-methacrylic acid copolymer, polystyrene resin, polycarbonate resin, polypropylene resin. The amount of filler used may vary depending on the chromogenic compound, developer and support material. The filler material is included as an extender material to reduce the amount of chromogenic compound and developer used and may be used to enhance the film-forming qualities of the chromogenic coating. The amount of filler material incorporated into the chromogenic coating composition should not substantially interfere with the development of the colored image.

A suitable binder material is needed to adhere the chromogenic compound and the color developer onto the substrate. The amount of binder generally used is about 10% to about 50% by weight, and preferably about 15% to about 35% by weight, based on the total weight of the solids of the coating composition. Examples of useful binders include starch, hydroxyethyl cellulose, methyl cellulose, carboxymethyl cellulose, gelatin, casein, gum arabic, polyvinyl alcohol, styrene-maleic anhydride copolymers, ethylene-acrylic acid copolymers, styrene-butadiene copolymers, acrylonitrile-butadiene copolymers, vinyl acetate emulsions, ethylene-vinyl acetate emulsions and polyvinylpyrrolidone.

The heat activatable chromogenic composition of the present invention may optionally additionally contain a color suppressant to prevent premature coloration. The color suppressant must be so chosen that it will not inhibit or adversely affect the color formation in the final product. Examples are ammonium hydroxide, alkanolamines, such as monoethanol amine, diethanolamine, N, N-dimethylethanolamine, and the like, condensates of amine-formaldehyde, such as urea-formaldehyde, melamine-formaldehyde, and the like. Suitable amounts of such color suppressants include from about 0.1 to about 10, preferably from about 0.5 to about 4 percent by weight based on the total dry weight of the coating composition. Other suitable color suppressants are disclosed, for example, in U.S. Pat. Nos. 4,010,292 and 4,170,483, which are hereby incorporated by reference.

The chromogenic coating composition may be prepared by a number of methods as known in the art. A preferred method of preparing the coating composition is to disperse one or more of the reactants into a volume of water as a dispersing medium. The reactants are generally ground for about one hour to a particle size of about 1 to 10 microns in diameter. The reactants may be ground in the presence of dispersants or binders. Examples of suitable dispersants include sodium dioctylsulfosuccinate, sodium dodecylbenzene sulfonate, alginates and fatty acid metal salts. The binder material may also function as a protective colloid to disperse the reactants. The chromogenic compound and the color developer may be mixed together and applied as one coating or prepared as separate coating compositions and applied in layers as discussed hereinafter in greater detail. The reactants are then ground or pulverized in a suitable device such as, for example, a ball mill, sand mill or attritor.

The verification area comprising the localized coating of a chromogenic composition may be treated so as to conceal location of the latent image message, since light reflection can reveal location of the message of the verification system. Thus, the latent image message can be coated with a thin coating comprising pigment in binder which conceals the latent image message without substantially reducing heat activated color development or heat activation characteristics of the chromogenic coating. A suitable coating may comprise, for example, inorganic fillers, such as calcium carbonate, titanium dioxide, talc, clay, or the like, in a polyvinyl alcohol solution. The thin coating provides the same texture to the support as the coating forming the latent image message and, thus, effectively conceals the message. Alternatively, concealment of the latent image message of the chromogenic coating may be accomplished by dot printing the latent image message or the entire surface of the document including the verification area using conventional printing inks in any color other than that of the latent image. Since the chromogenic coating is colorless, the pigmented coating or dot printing may be applied either prior to or after application of the chromogenic coating to the substrate.

The chromogenic coating composition is applied to the substrate, for example, paper, plastic, or the like, which forms the document by any suitable technique as known in the art. The entire substrate may be coated although in preferred embodiments a localized, spot or band coating is used. The coating may be coextensive with the information area and the principal image since the coating is non-pressure sensitive and not affected by the pressure applied when the document is printed or written on such as by a pen to supply additional information. In one embodiment of the invention, the chromogenic coating composition is prepared as a slurry comprising the chromogenic compound and the color developer. A preferred method of coating is by off-set gravure coating as disclosed in U.S. Pat. No. 4,425,386 to Chang which is hereby incorporated by reference. Alternative preferred coating methods include flexographic, screen printing, nozzle extrusion and ink jet printing.

The chromogenic coating material may be activated by any suitable means which provides heat to the coating, such as the heated stylus of a thermal printer. Verification that the document, such as a cash register receipt, discount coupon, or the like is authentic may be achieved by activating portions of the chromogenic coating by any desired means, such as by quickly rubbing a blunt implement across the verification area to generate sufficient frictional heat to produce a colored image. For convenience, a suitable implement may be a fingernail rubbed quickly across the verification area to generate frictional heat and produce a colored line. Other implements which may be used include a non-writing end of a pen, a stylus, paper clip, coin and the like. Generally, metal objects are not as effective in producing a colored image since the metal conducts the frictional heat quickly away from the point of contact and has a lower friction coefficient than many other objects. Thus, a fingernail or plastic object is generally preferred.

However, any suitable means for applying sufficient heat, whether frictional or otherwise, can be used to heat the chromogenic composition and produce a visible colored image. The heat providing means should be capable of heating the chromogenic composition to a temperature of between about 40° C. to 200° C., preferably between about 40° C. or 50° C. to about 110° C. or 140° C., with between about 50° C. and about 80° C. being especially preferred for certain applications. Thus, suitable heat sources include ordinary electric light bulbs, for example, 80–150 watt bulbs, hand-held electric hair dryers, coffee mugs containing a hot liquid, or like devices which generate such temperatures. Similarly, a heated metal element, such as a flat plate-like element for direct application of heat to the chromogenic composition, may be used.

In a further embodiment illustrated in FIGS. 2 and 3, a document in the form of a check 16 comprises an information area 18 having a principal image. The principal image in the information area 18 contains a conventional printed image as in the embodiment of FIG. 1. Also included on the check of this embodiment is a designated endorsement area 20 on the back face of the check opposite the principal image. The endorsement area 20 defines the area at one end of the check for the payee's endorsement. As shown in FIG. 3, the endorsement area includes a pre-printed principal image providing instructions for the person endorsing the check according to standard banking procedures. In the left portion of the endorsement area as shown in FIG. 3 is a verification area 22 comprises a coating of a mixture of the chromogenic compound and the color developer to form an autogenous chromogenic coating. In this manner, the verification area is in a handy position next to the endorsement area of the check. Thus, if the check is submitted for payment, the person receiving the check can verify the authenticity of the check by quickly rubbing their fingernail or other hard object across the verification area adjacent the signature to produce the colored image. Since the chromogenic coating is not pressure sensitive, endorsement, alone, will not activate the coating and produce a visible color.

Verification area 22 can be, for example, a solid, regular shaped coating in the form of a rectangle, as shown, which may be formed of multiple chromogenic coatings, for example, three rectangular-shaped chromogenic coatings 22*a*, 22*b* and 22*c*, each rectangular coating providing a different color when frictional heat is applied. Thus, when the fingernail or other stylus is quickly drawn across and in contact with area 22, a line composed of, for example, blue, green and red segments results.

The verification system of the invention provides an effective and simple way of preventing fraudulent passing off of a reproduction of an original document. The chromogenic coating of the present invention is colorless until activated and, thus, it would not be apparent to the would-be forger that the original contains the chromogenic coating forming the verification system. Although advanced copiers are able to make copies which are virtually indistinguishable to the naked eye, the photocopier cannot reproduce the chromogenic coating. Thus, when the lawbreaker presents the photocopied document, authenticity of the document can be quickly verified by application of heat, such as by rubbing a frictional heat generating implement, such as a fingernail or stylus, in the verification area to produce a colored or multicolored image. In this manner, a document such as a check, money order or prescription, which is suspected of being a fraudulent copy, can be authenticated by a store clerk or bank teller without the need for specialized equipment or training. When a colored or multicolored image appears in the area, the authenticity of the document is verified. Failure to produce a colored image indicates that the document is a copy and not the original.

The chromogenic coating is colorless as well as being non-pressure sensitive, and non-reactive at room temperature without heat. The chromogenic coating can therefore be located in any position on the document both without being noticeable and without premature activation with normal handling of the document. For example, the chromogenic coating of the present invention can be in an area of the document which is subjected to pressure by writing or endorsement without being conspicuous and without premature activation.

The chromogenic coating in the verification area in preferred embodiments is formed from at least one chromogenic compound and a color developer. The chromogenic compound and the color developer are activated by added heat to interact and react to produce the colored image. In the embodiments of FIGS. 1–3, the chromogenic compound and the color developer are intimately mixed and applied to the information area as a uniform coating. In this manner, frictional heat applied by an object to any portion of the information area will produce a colored image in that portion only.

In the present invention, each chromogenic coating is a self-contained coating comprising a solid acidic color developer compound co-reactant and a colorless or substantially colorless solid chromogenic reactant. In preferred embodiments, the color developer has a melting or softening point of about 40° C. to about 200° C., preferably from about 40° C. or 50° C. to about 110° C. or 140° C., especially 50° C. to about 80° C., so as not to react with the chromogenic reactant at room temperature. Application of heat at temperatures in the range of 40° C. to about 200° C. softens or melts the developer rendering it sufficiently mobile to mix and react with the chromogenic compound and produce the distinct visible colored image in situ. Since the reactants are solids at room temperature, no physical separation of the reactants is necessary in the coating. The reactants can be mixed together as a slurry and coated on the document to form an autogenous layer. The chromogenic coating is activated by heat and the coating is non-pressure sensitive.

To have an eye catching result to verify authenticity of the document, for example, it is desirable for the autogenous chromogenic coating to present a striking color contrast to that of the principal image. For example, the dollar amount of a check or the printed information on the check may be in black ink and the color developed by the autogenous coating can be red, violet, orange, green, blue, or yellow to obtain a high degree of contrast. Alternatively, the developed color can be coordinated with the requirements of the financial institution in the case of a check or money order, and may be, for example, the same color as the principal image. Of course, highly contrasting colors can be used, and multiple chromogenic coatings each producing a different colored visible image can be used in the verification area. Thus, for example, a red dot on a black rectangular background could be provided upon activation of the verification area.

In a further embodiment illustrated in FIG. 4, the chromogenic composition is coated onto the document 24 within the verification area 26. The verification area 26 is shown adjacent the endorsement area 28 on the rear face of the check in a manner similar to the embodiment of FIG. 2. The endorsement area 28 includes indicia such as instructions to endorse within the endorsement area. In this embodiment, the chromogenic coating composition in the verification area is applied as a multi-layer coating within the localized area. In this embodiment, the chromogenic compound is applied to the substrate of the document as a first layer 30. A second layer 32 comprising the color developer is coated over the first layer to provide the colored image forming coating system.

Verification area 26 may also include pre-printed indicia to provide instructions for use and operation of the verification system. For example, such instructions can read "Scratch here to have color appear—if no color appears, do not accept this document." The chromogenic coating in the verification area can be heat activated in a manner similar to the embodiment of FIG. 2, for example, by rubbing or striking the coating with a blunt object to provide frictional heat and produce the colored image, thereby verifying the document as an original. Likewise, any source of heat may be used to provide the desired activation temperature resulting in a colored image.

Alternatively, the color developer can be applied first onto the substrate, according to the process described in the above-mentioned U.S. Pat. No. 4,425,386. The chromogenic compound is then coated onto or printed over the first coating. The color reactants may be dissolved or dispersed in a vehicle such as a printing ink base, and the resulting solution printed onto the substrate.

Figure 6:
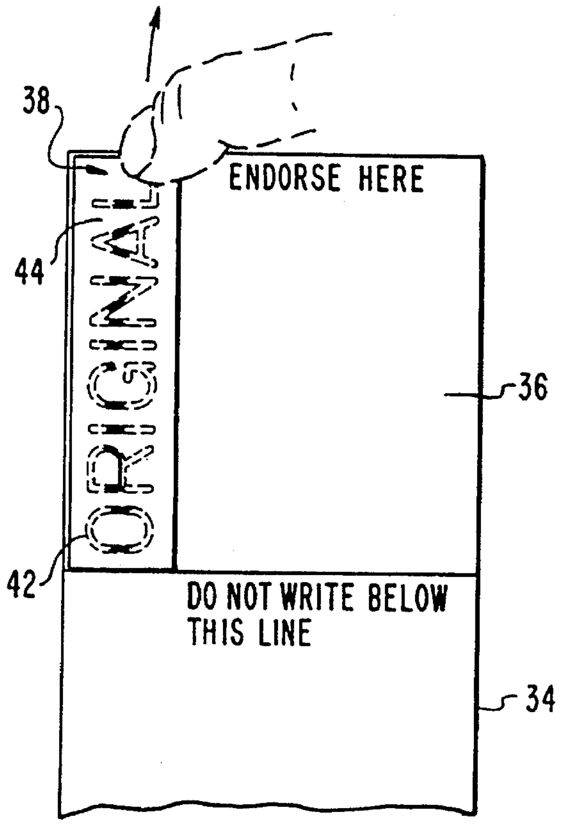
FIG. 6 is a partial, schematic and perspective view of the check of FIG. 5 after applying frictional heat to a portion of the verification area.
Figure 7:
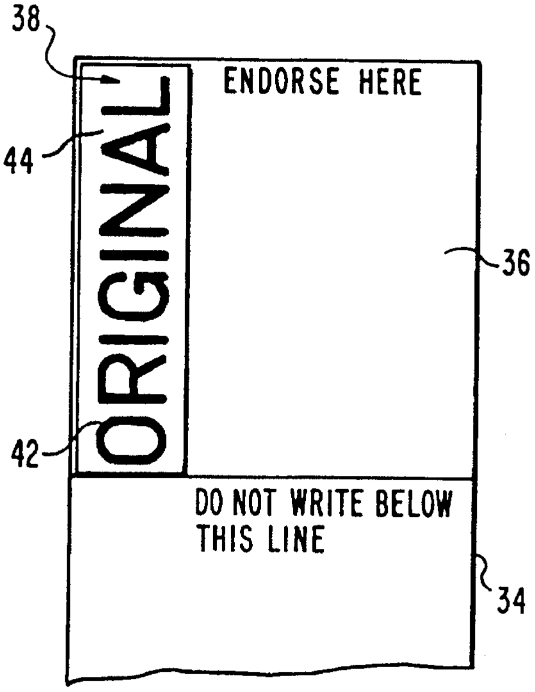
FIG. 7 is a partial, schematic and perspective view of the check of FIG. 5 having the colored image completely displayed to provide verification of the authenticity of the check.

In a further embodiment illustrated in FIGS. 5, 6 and 7, a document 34 is a check including an endorsement area 36 having a verification area 38 comprising chromogenic composition coating 40. The chromogenic compound is formed into a colorless ink and printed to form the word "ORIGINAL" or other alerting message 42 as a latent image on the verification area 38. A layer comprising the color developer 44 is then coated over the chromogenic compound-printed alerting message to form the image-forming chromogenic coating 40. In alternative embodiments, the color developer may be applied as the printed latent image message 42 followed by the chromogenic compound as the coating 44. Although color developer may be spot printed to form the latent image, it is generally preferred to produce the latent image from the chromogenic compound. Alternatively, the latent image may be formed from a mixture of the chromogenic compound and color developer and printed onto the endorsement area 36 to provide the latent image message of FIG. 5 as an autogenous, heat sensitive message.

In use, authenticity of the check can be distinguished from a photocopy or other form of reproduction without the need for specialized equipment. The verification system is activated by applying heat, such as by quickly rubbing the verification area with a fingernail or other blunt object. A single stroke across the verification area 38 to apply sufficient frictional heat will cause the chromogenic compound to react with the color developer and to partially produce the colored image in the form of colored segments as shown in FIG. 6. Applying repetitive strokes across the verification area will cause the entire image 42 to develop as shown in FIG. 7.

In the embodiment of FIGS. 5–7, the latent image 42 is in the form of a word. In alternative embodiments, the latent image can be, for example, a business logo, design, diagram, serial number, combinations of numbers and letters, or other indicia capable of identifying the document.

The latent image is formed of a chromogenic composition which provides a different color from the background on which it is coated when activated. Thus, for example, the latent image word "ORIGINAL" in FIG. 5 could be formed by printing an autogenous chromogenic composition which forms a red visible image onto a background coating of a chromogenic composition which forms a black visible image. Thus, when a fingernail is quickly drawn across the coating in the manner of FIG. 6, the visible portions of the word would appear red, and the visible portions of the background would appear black, yielding a visible line with red and black segments. Also, if desired, the latent image may merely be a circular red image providing background. In other words, any desired configuration may be utilized.

In the embodiment of FIG. 8, prescription form 50 is provided with printed matter 52 including the prescribing doctor's office hours and telephone number in verification area 54 which comprises a black color-producing autogenous chromogenic composition in the form of a solid rectangle. Within the rectangular-shaped coating 54 is a red-color producing autogenous chromogenic composition 56 in the form of a solid circle. Form 50 is coated with dot printing 58 of a printing ink solution which may be a white pigment coating applied to the entire surface of form 50 prior to printing of information, such as 52, to conceal the location of entire verification area 54. After prescription 50 is completed by the physician and presented at the drug store to be filled, the pharmacist or clerk may easily verify that it is an original rather than a reproduction, by applying heat locally to the verification area. Thus, if the clerk rubs or strikes a fingernail quickly across the center of the entire verification area 54, a multi-colored line, which is black, red, black in sequence, will result from the frictional heat, signifying that it is an original.

Alternatively, the clerk or pharmacist may subject verification area 54 to heat generated by an ordinary electric light bulb used for reading, e.g., a 100 watt bulb, or a hand held hair dryer,. and the chromogenic compositions in area 54 will reveal a solid red dot or circle in a black rectangle background.

In the embodiment of FIG. 9 a cash register receipt form 100 has been coated with a substantially colorless, localized coating of a heat activatable chromogenic composition in the form of a continuous, longitudinal stripe 110 along the length of receipt 100. Coated stripe 110 can be heated to provide, for example, a red image. Adjacent coatings 112 and 114 are second and third localized coatings, respectively, of substantially colorless, heat activatable chromogenic compositions in the form of continuous, longitudinal stripes, which are heat activatable to provide, for example, blue and black colors, respectively, along the length of receipt 100. When receipt for 100 is imprinted by means of the thermal printer of a grocery store cash register, the price of each of the grocery items, for example "1.29" will appear in red, the quantity, for example "1 doz." in blue and the name of the item, for example, the word "milk" will appear in black.

By highlighting the various items in this manner, the resulting receipt 100 enables the customer to immediate locate the item, and its price, if desired. Later, if the customer presents receipt 100 to a store employee with one or more of the listed items for return and a cash refund, the store employee can verify that the receipt is authentic by running a fingernail across the width of the receipt. If the receipt is authentic the employee will see a line composed of red, blue and black segments. If the receipt is an unauthorized photocopy, no such multicolored line will appear. This will prevent dishonest persons from shoplifting grocery items along with purchased items, and returning the illicit items for cash.

FIG. 10 is a cash register receipt illustrating another embodiment of the invention in which receipt 120 is provided with a fully coated surface of coating of a substantially colorless, heat activatable chromogenic composition, which upon heating provides a black color. Coating 122 is, in turn, coated with a series of rectangularly shaped, localized coatings of a heat activatable chromogenic composition which alternatively vary in color produced upon heating and form a continuous, longitudinal stripe along the length of receipt 120. Thus, localized coatings 124 will produce a red color image upon contact by the thermal printer, while localized coatings 126 will produce a blue color upon contact by the thermal printer. This alternating color-producing sequence continues for the length of the stripe. Obviously, more than two different colors may be used, if desired, to provide alternating colors in a repetitive fashion. Similarly, all or a portion of the entire surface of receipt 120 could be coated with alternating localized coatings of heat activatable chromogenic compositions, if desired, in place of full coating 122 and enable use of uncoated base or substrate paper a support for only localized coatings.

Verification of receipt 120 can be accomplished in the same manner as described for receipt 100, since application of heat, such as by applying the frictional heat of a fingernail across receipt 120 will provide one or more colors if the receipt is authentic and not an unauthorized copy.

Figure 11:
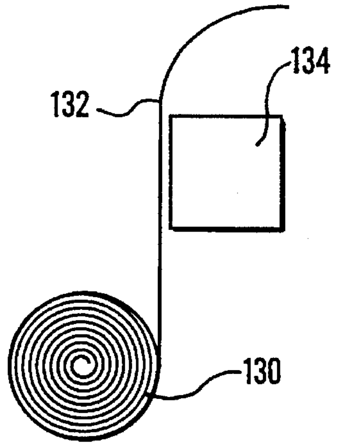
FIG. 11 is a partial, schematic and side elevational view of a continuous form cash register receipt form being contacted with the stylus of a computer controlled thermal printer imprinting data on the face of the receipt form.

FIG. 11 is a schematic in which a continuous cash register receipt in the form of roll is being fed such that receipt form 132 is contacted with the stylus of a computer controlled thermal printer 134 to imprint data on the face of the receipt form, illustrated in FIGS. 9 and 10. The visible, colored images appearing on the receipt paper are formed by contact of the heated stylus of the thermal printer on the receipt paper. The information provided to the receipt paper can vary depending on use of the paper, for example, receipt for a cash register or an ATM machine, so that the placement of the localized coatings and their shape can be tailored to highlight the information desired for a particular application or customer.

Figure 12:
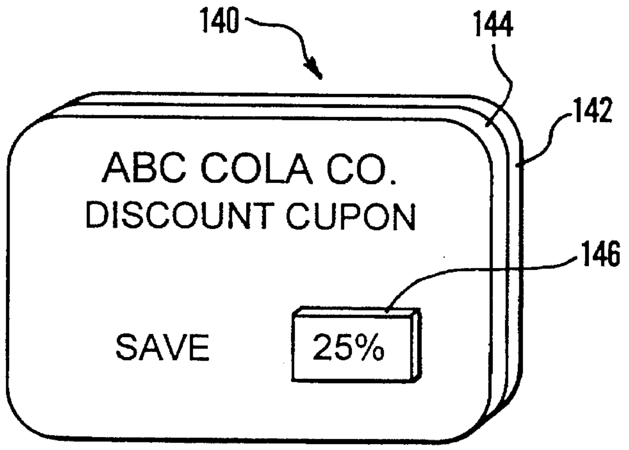
FIG. 12 is a schematic and perspective view of a discount coupon having thermally printed discount information highlighted in accordance with the present invention.

FIG. 12 illustrates another embodiment of the present invention in which a coupon 140 comprising paper substrate 142 is provided with a coating 144 of a substantially colorless, heat activatable chromogenic composition, which upon heating by a thermal printer or the like provides a black color. A localized coating 146 of a substantially colorless, heat activatable chromogenic composition which produces a red color on heating is coated as a spot coating on coating 142 at a predetermined location to highlight the coupon discount, which as illustrated in FIG. 12, is "25%". Since the information remains the same on each discount coupon 140, the same data can be highlighted on each coupon, if desired. Thus, coating 144 produces a red color upon contact by a thermal printer to yield the "25%" in red while the remaining lettering shown outside coating 146, such as "ABC Cola Co.", is thermally activated to a black color.

Figure 13:
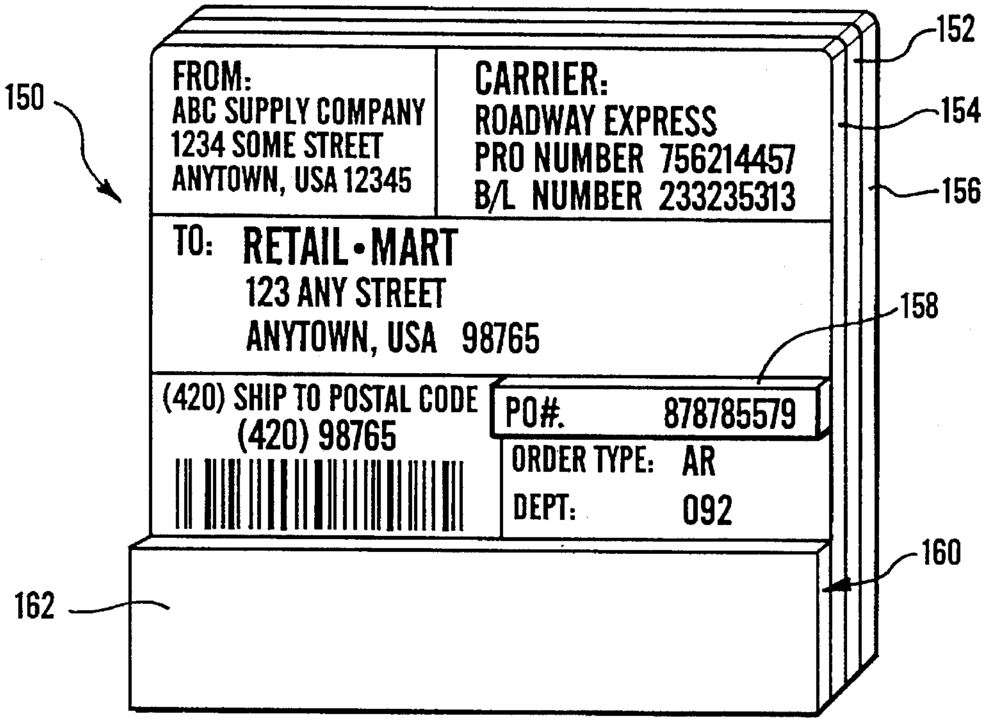
FIG. 13 is a schematic and perspective view of a pressure sensitive label having thermally printed purchase order information.

FIG. 13 illustrates a further embodiment of the present invention in which pressure sensitive label, for example, mailing label 150 comprises substrate 152 having a coating 154 of a substantially colorless, heat activatable chromogenic composition on the front surface of substrate 152, which upon heating provides, for example, a black color. Label 150 has a pressure sensitive coating 156 on the back of substrate 152 to adhere the label to an article to be shipped. If desired, label 150 can be provided with a release liner backing for the pressure sensitive coating. In such event, the combination of a pressure sensitive coating layer and a release liner backing layer is represented schematically by layer 156. Localized coatings 158 and 160 of a substantially colorless, heat activatable chromogenic composition are coated as spot coatings on coating 154 at predetermined locations. Coating 158 can, for example, provide a red color upon heating and, thus, when the stylus of a thermal printer is applied, the purchase order number "878785579" will appear in red and thus be highlighted to contrast information such as the addressee, the carrier, etc., which will appear in black. Localized coating 160 may be used by the addressor, for example, to highlight information of choice, such as instructions, on the surface 162 of coating 160 in red or some other color. By highlighting the purchase order and other selected information of choice, the recipient can focus on the highlighted information and facilitate confirmation of receipt of the order.

The invention will be further illustrated by the following examples. All percentages are by weight unless otherwise specified. It should be understood that it is not intended to limit the scope of this invention.

EXAMPLE 1

A chromogenic composition is prepared from a mixture of 25 grams of 7,7'-bis(3-diethylaminofluoran) and 85 grams of calcium carbonate in 275 grams of a 10 weight percent aqueous polyvinyl alcohol solution. The mixture is ground in an attritor for one hour to reduce the size of the particles and produce a dispersion.

A color developer is produced by mixing 80 grams of 4-hydroxy-4'-isopropoxyphenylsulfone and 20 grams of dibenzyl oxalate in 250 grams of 10 weight percent polyvinyl alcohol aqueous solution. The mixture is ground in an attritor for one hour to reduce the particle size of the components and produce a dispersion.

The chromogenic coating composition is prepared by mixing equal parts by weight of the chromogenic dispersion and the color developer dispersion. A spot is then coated on the back side of a check proximate the endorsement area and allowed to dry. Striking the coating with a fingernail immediately produces a red-colored line.

EXAMPLE 2

A mixture of 47.6 grams of the color former 3,3-bis(1-octyl-2-methylindol-3-yl)phthalide, along with 16.7 grams of aluminum stearate, 83.3 grams of calcium carbonate, and 9.5 grams of silicone defoamer at 40 weight percent solids is ground in 250 grams of 5 weight percent polyvinylpyrrolidone solution (commercially available from International Specialty Products as PVP K30) in an attritor for one hour. The total solids is 40 weight percent.

Meanwhile another mixture of 61.5 grams of the color developer 4-hydroxy-4'-isopropoxyphenylsulfone, along with 61.5 grams of dibenzyl oxalate, 20.5 grams of silicone defoamer at 40 weight percent solids, and 145 grams of titanium dioxide in 474 grams of 10.4 weight percent polyvinylalcohol solution is ground in an attritor for one hour. The total solids is 42.7 weight percent.

The two resulting mixtures are then stirred together to obtain a coating slurry. A ¾ inch wide stripe is coated with the slurry on black-imaging facsimile paper (commercially available from Appleton Papers Incorporated as Appleton Thermal Paper 15# T1022A) and dried. The coated paper is slit to 2¼ inches wide and wound into a roll 1½ inches in diameter. The roll is fed into a cash register equipped with a thermal printer. Upon imaging, red images are developed within the stripe and black images are developed outside the stripe zone.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. A document capable of providing multiple colors under the application of heat, which comprises:

a support having at least one surface bearing a first coating comprising a substantially colorless, heat activatable chromogenic composition capable of producing a first color under the application of heat, and a second coating comprising a localized coating of a substantially colorless, heat activatable chromogenic composition capable of producing a second color under the application of heat, said first and second coatings being non-coextensive, each of said first and second coatings being at least partially exposed, each said chromogenic composition comprising a chromogenic compound and a color developer, said chromogenic compound and said color developer being substantially colorless solids in physical contact prior to reaction, but which can chemically react to produce a visible colored image by application of heat at temperatures above room temperature.

2. The document of claim 1, wherein said second coating partially overlaps said first coating.

3. The document of claim 2, wherein said second coating forms a stripe configuration on said first coating.

4. The document of claim 2, wherein multiple second coatings are supported by said first coating.

5. The document of claim 1, wherein at least one surface of said substrate bears a third coating comprising a localized coating of a substantially colorless, heat activatable chromogenic composition capable of producing a third color under the application of heat, said third coating being at least partially exposed.

6. The document of claim 2, wherein a third coating comprising a localized coating of a substantially colorless, heat activatable chromogenic composition capable of producing a third color under the application of heat partially overlaps said first coating, said third coating being at least partially exposed.

7. The document of claim 2, wherein said document is a negotiable instrument, receipt paper, a coupon or a pressure sensitive label.

8. The document of claim 7, wherein said document is a negotiable instrument.

9. The document of claim 7, wherein said document is receipt paper.

10. The document of claim 7, wherein said document is a pressure sensitive label.

11. The document of claim 9, wherein said second coating is in the form of a stripe.

12. The document of claim 11, wherein said stripe is positioned to highlight entries on said receipt paper under the application of heat by a thermal printer.

13. The document of claim 1, wherein said first coating is a localized coating of said chromogenic composition.

14. The document of claim 1, wherein said first and second coatings are substantially parallel stripes on said substrate.

15. The document of claim 1, in which said first color is black and said second color is red.

16. The document of claim 9, wherein said substrate is a in the form of a continuous roll.

17. The document of claim 1, wherein said first and second localized coatings of a heat activatable chromogenic composition are each heat activatable at a temperature in the range of between about 40° C. and about 200° C.

18. The document of claim 17, wherein said first and second localized coatings of a heat activatable chromogenic composition are each heat activatable at a temperature in the range of between about 50° C. and about 80° C.

19. The document of claim 1, wherein said first and second localized coatings of a heat activatable chromogenic composition are each frictional heat activatable.

20. The document of claim 1, wherein said first and second localized coatings of a heat activatable chromogenic component are coated to conceal their location.

21. The document of claim 1, wherein each said chromogenic composition further comprises an activation temperature suppressant material.

22. The document of claim 21, wherein said activation temperature suppressant material is selected from the group consisting of stearic acid amide, stearic acid methylene bisamide, oleic acid amide, palmitic acid amide, coconut fatty acid amide, dibenzylterephthalate, p-benzyl biphenyl, beta-naphthol benzyl ether, ethylene glycol-m-tolyl ether, di(p-chlorobenzyl)oxalate, dibenzyl oxalate and di(p-methylbenzyl)oxalate.

23. A method of verifying the authenticity of a document, said document comprising a support bearing an information area and a verification area, said information area comprising a visible principal image;

said verification area comprising a localized coating of a heat activatable chromogenic composition capable of forming a visible colored image, said method comprising thermally activating a document capable of providing multiple colors under the application of heat utilizing a heated printing stylus, said document comprising a support having at least one surface bearing a first coating comprising a substantially colorless, heat activatable chromogenic composition capable of producing a first color under the application of heat, and a second coating comprising a localized coating of a substantially colorless, heat activatable chromogenic composition capable of producing a second color under the application of heat, said first and second coatings being non-coextensive, each of said first and second coatings being at least partially exposed, each said chromogenic composition comprising a chromogenic compound and a color developer, said chromogenic compound and said color developer being substantially colorless solids in physical contact prior to reaction, but which can chemically react to produce a visible colored image by application of heat at temperatures above room temperature, said thermal activation providing information on said substrate, thereafter applying heat to at least one of said first or second coatings of said heat activatable chromogenic composition to form a visible colored image to verify authenticity of said document.

24. The method of claim 23, wherein authenticity of said document is verified by applying frictional heat.

25. The method of claim 23, wherein said document is a cash register receipt or a negotiable instrument.

26. The document of claim 2, wherein said substantially colorless, heat activatable chromogenic composition of said second coating additionally comprises titanium dioxide.

27. The document of claim 2, wherein said first coating fully covers said support.

28. The document of claim 8, wherein said receipt paper is a cash register receipt form, said first coating fully covers said support of said cash register receipt form, and said second coating is in the form of a stripe on said first coating.

* * * * *